United States Patent
Namikata (10) Patent No.: US 6,928,190 B2
(45) Date of Patent: Aug. 9, 2005

(54) IMAGE DISCRIMINATION APPARATUS, COPIER AND IMAGE DISCRIMINATION METHOD

(75) Inventor: Takeshi Namikata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 646 days.

(21) Appl. No.: 09/941,594

(22) Filed: Aug. 30, 2001

(65) Prior Publication Data

US 2002/0027671 A1 Mar. 7, 2002

(30) Foreign Application Priority Data

Sep. 5, 2000 (JP) ........................................ 2000-268670

(51) Int. Cl.$^7$ ............................................... G06K 9/68
(52) U.S. Cl. ..................................... 382/218; 382/190
(58) Field of Search ................................ 382/100, 135, 382/165, 181, 190, 209, 218, 219, 306

(56) References Cited

U.S. PATENT DOCUMENTS

| | | | | |
|---|---|---|---|---|
| 5,010,580 A | * | 4/1991 | Vincent et al. ............. | 382/163 |
| 5,434,649 A | * | 7/1995 | Hasuo et al. ................ | 399/366 |
| 5,436,735 A | * | 7/1995 | Tanabe et al. .............. | 358/453 |
| 5,502,575 A | * | 3/1996 | Kai et al. .................... | 358/405 |
| 5,640,467 A | * | 6/1997 | Yamashita et al. .......... | 382/181 |
| 5,771,315 A | * | 6/1998 | Matsuyama ................. | 382/191 |
| 6,493,462 B1 | * | 12/2002 | Inoue .......................... | 382/170 |

* cited by examiner

Primary Examiner—Daniel Miriam
(74) Attorney, Agent, or Firm—Fitzpatrick, Cella, Harper & Scinto

(57) ABSTRACT

In an image discrimination apparatus for discriminating a prescribed image pattern contained in the image of an original, a plurality of marks having a prescribed color density and disposed in a predetermined positional relationship are extracted from an input original image and distances between the extracted plurality of marks are calculated (S800–S811). The calculated distances between the plurality of marks are compared with distances, stored in advance as a template, between a plurality of marks constituting the prescribed image pattern. Whether or not the prescribed image pattern is present in the original image is determined in accordance with the result of the comparison (S812–S814).

6 Claims, 9 Drawing Sheets

BINARIZING BLOCK

FIG. 5

FEATURE EXTRACTION MASK

FIG. 6

FEATURE-POINT POSITION BUFFER

FIG. 7

FEATURE-POINT POSITION BUFFER
IF ORIGINAL HAS BEEN ROTATED

FIG. 9

DISTANCE TEMPLATE

{DistOA, DistOE, DistOF, DistOD, DistOB, DistOC} ~ 901

{DistAD, DistAC, DistAE, DistAF, DistAB} ~ 902

{DistBE, DistBC, DistBF, DistBD} ~ 903

IMAGE DISCRIMINATION APPARATUS, COPIER AND IMAGE DISCRIMINATION METHOD

FIELD OF THE INVENTION

The present invention relates to an image discrimination apparatus, copier and image discrimination method, e.g., an image discrimination apparatus, copier and image discrimination method for discriminating a prescribed image pattern contained in an original image.

BACKGROUND OF THE INVENTION

The technical development of full-color copiers in recent years has made it possible even for ordinary users to readily perform copying in which the image quality of the copy is not that much different from that of the original. There is the fear that originals such as banknotes and negotiable instruments whose copying is prohibited by law may be counterfeited by making unlawful use of such full-color copiers.

In a known technique proposed in order to prevent such counterfeiting of originals, all or part of a specific original such as a banknote or negotiable instrument is stored in a copier beforehand as a distribution in color space or as a spatial pattern. When a copying operation is performed, discrimination processing (pattern matching) to determine whether an original is such a specific original is executed and the copying operation is inhibited if it is determined that the original is a specific original.

With the conventional technique described above, the usual practice is to subject the entirety of the specific original to pattern matching or to extract an image pattern from the specific original and subject this pattern to matching processing. However, if, when the original is read, the original to be copied is read in an orientation that differs from the assumed orientation, it is necessary to deal with the orientation (rotation) of the original. This means that it is necessary for image patterns that have been rotated through a number of different angles to be retained beforehand in the copier as templates, and it is required that pattern-matching processing be repeated a number of times equivalent to the number of templates when a copying operation is carried out.

Further, in order to arrange it so that banknotes or negotiable instruments of a greater number of types can be discriminated, a commensurate number of templates must be retained within the copier. As a consequence, a larger memory capacity is needed to hold these templates and a problem that arises is a very large increase in cost.

In addition, in order to prevent the copying of a specific original with the conventional technique described above, the templates that have been stored in the copier must be updated or added to whenever there is an increase in the types of specific originals whose copying is prohibited. This makes management difficult.

SUMMARY OF THE INVENTION

The present invention has been proposed to solve the conventional problems and has as its object to provide an image discrimination apparatus, copier and image discrimination method in which a prescribed image pattern contained in an original image is discriminated highly precisely and rapidly regardless of the orientation of the original image.

According to the present invention, the foregoing object is attained by providing an image discrimination apparatus for discriminating a prescribed pattern contained in an original image, comprises extraction means for extracting, from an input original image, a plurality of marks having a prescribed color density and disposed in a predetermined positional relationship, calculation means for calculating the relative positional relationship of the plurality of marks extracted by the extraction means, and discrimination means for discriminating whether or not the prescribed image pattern is present in the original image based upon the relative positional relationship calculated by the calculation means.

In a preferred embodiment, the calculation means calculates distances between the plurality of marks, which have been extracted by the extraction means, as the relative positional relationship, and the discrimination means includes storage means for storing distances between the plurality of marks, which constitute the prescribed image pattern, as a template, and determines whether or not the prescribed image pattern is present in accordance with result of a comparison between the distances between the plurality of marks calculated by the calculation means and the distances between the marks stored in the storage means as the template.

In this case, the discrimination means calculates the sum total of errors between the distances between the plurality of marks calculated by the calculation means and the distances between the marks stored in the storage means as the template, and judges that the prescribed image pattern is present in the original image when the sum total is smaller than a predetermined value.

Further, the present invention provides a copier, which includes the image discrimination apparatus having any of the arrangements described above, for printing a copy of an original based upon image information relating to the original to be copied, the copier having control means which, when it has been determined that the prescribed image pattern is present in the original image, executes image processing (e.g., inhibition of printing) that is different from that executed when it is judged that the prescribed image pattern is not present in the original image.

Further, in order to attain the foregoing object, the present invention provides an image discrimination method for discriminating a prescribed pattern contained in an original image, comprises an extraction step of extracting, from an input original image, a plurality of marks having a prescribed color density and disposed in a predetermined positional relationship, a calculation step of calculating the relative positional relationship of the plurality of marks extracted at the extraction step, and a discrimination step of discriminating whether or not the prescribed image pattern is present in the original image based upon the relative positional relationship calculated at the calculation step.

In a preferred embodiment, the calculation step calculates distances between the plurality of marks, which have been extracted at the extraction step, as the relative positional relationship, and the discrimination step compares distances between the plurality of marks calculated at the calculation step and distances between the plurality of marks, which constitute the prescribed image pattern, stored in advance as a template, and determines whether or not the prescribed image pattern is present in accordance with result of the comparison.

The discrimination steps calculates the sum total of errors between the distances between the plurality of marks calculated at the calculation step and the distances between the marks stored in advance as the template, and judges that the prescribed image pattern is present in the original image when the sum total is smaller than a predetermined value.

Furthermore, the foregoing object is attained also by program code constituting the operating commands of the image discrimination apparatus or image discrimination method having the structure described above, and by a computer-readable storage medium on which this program code has been recorded.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

A preferred embodiment of the present invention will now be described in detail in accordance with the accompanying drawings.

An image discrimination apparatus according to the present invention will now be described in detail with reference to the drawings as an embodiment applied to a color copier.

Figure 1:
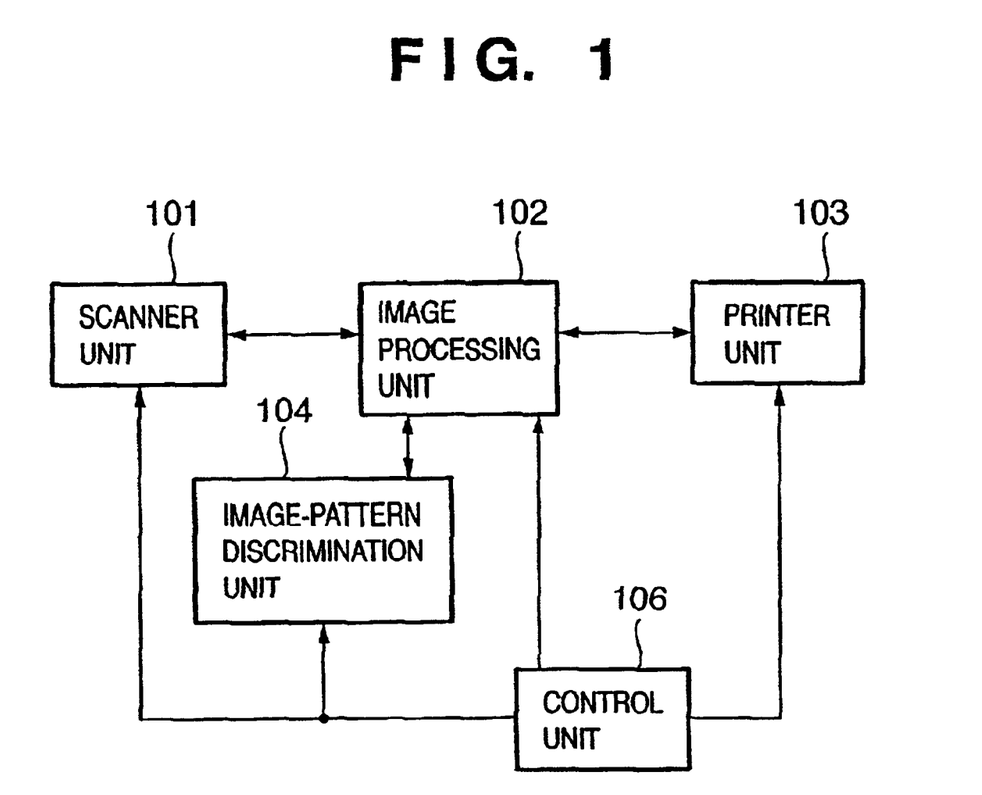
FIG. 1 is a block diagram illustrating the general structure of a color copier according to this embodiment of the present invention.

FIG. 1 is a block diagram illustrating the general structure of a color copier according to this embodiment.

A scanner unit 101 in FIG. 1 has a document glass and reads an image (original image), which has been placed on the document glass, by the usual optical processing. An image processing unit 102 subjects an image signal representing the original image output from the scanner unit 101 to processing (filter processing, etc.) for eliminating image deterioration or to a color-space conversion (output masking, etc.) suited to a printer output. A printer unit 103 prints the image signal, which has been sent from the image processing unit 102, on paper serving as a printing medium. The image signal is printed as the copy image of the original image by the usual method.

Figure 2:
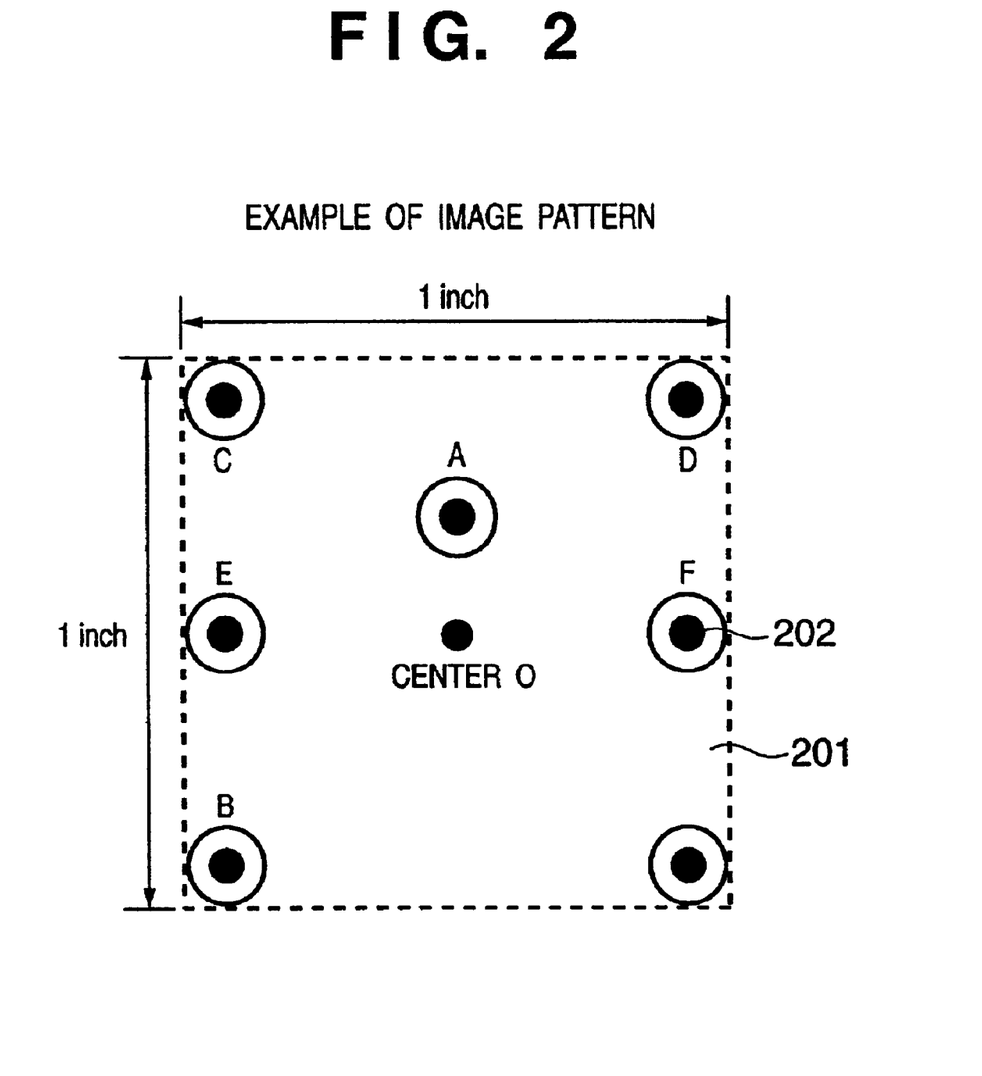
FIG. 2 is a diagram exemplifying an image pattern that has been formed on a specific original.

When a copying operation for copying the original image read by the scanner unit 101 is performed, an image-pattern add-on unit 105 sets an image signal, which represents a prescribed image pattern exemplified in FIG. 2, in the image processing unit 102 in order that the prescribed image pattern will be added onto the copy output (copy) produced by the printer unit 103. This image pattern represents predetermined information (the details of which will be described later).

An image-pattern discrimination unit 104 accepts the image signal, which has been subjected to the prescribed image processing such as masking by the image processing unit 102 and, on the basis of this image signal, determines whether the original image read by the scanner unit 101 contains the prescribed image pattern. The result of this determination is reported to the image processing unit 102. The details of this operation will be described later.

If the image-pattern discrimination unit 104 has determined that the original image contains the image pattern, the image processing unit 102 executes predetermined control processing to inhibit printing of the original image by the printer unit 103 or to make it impossible for the printer unit to produce a normal copy of the original image.

The operations described above are performed in concert under the control of a control unit 106 (e.g., by controlling the processing times of the units mentioned above). Since the scanner unit 101 and printer unit 103 can be of the type mounted on an ordinary color copier, the operations of the units need not be described in detail in this embodiment. Further, the image processing unit 102 also can be implemented by the usual processing unit (module) mounted on an ordinary color copier for operations other than that for controlling the printing operation by the image processing unit 102 in accordance with the result of discrimination acquired from the image-pattern discrimination unit 104, as will be described later. Accordingly, the image processing unit 102 need not be described in detail in this embodiment.

FIG. 2 is a diagram exemplifying an image pattern that has been formed on a specific original.

As shown in FIG. 2, the image pattern according to this embodiment is composed of concentric circular marks A, B, C, D, E and F (202), which have been printed at a color density within a predetermined range, disposed at a suitable positional relationship within a square area 201 that is one inch on a side. Further, the color density within the area (positioning mark) 201 differs from that of the marks (code-information marks) 202 to such an extent that the marks 202 can be distinguished. Though it is preferred that the color of the marks 202 be yellow, which is not readily noticeable by the human eye, there is no particular limitation on the color so long as the background can be distinguished. Further, the shape and arrangement of the marks and the number of the marks are not limited to those described in this embodiment.

Figure 3:
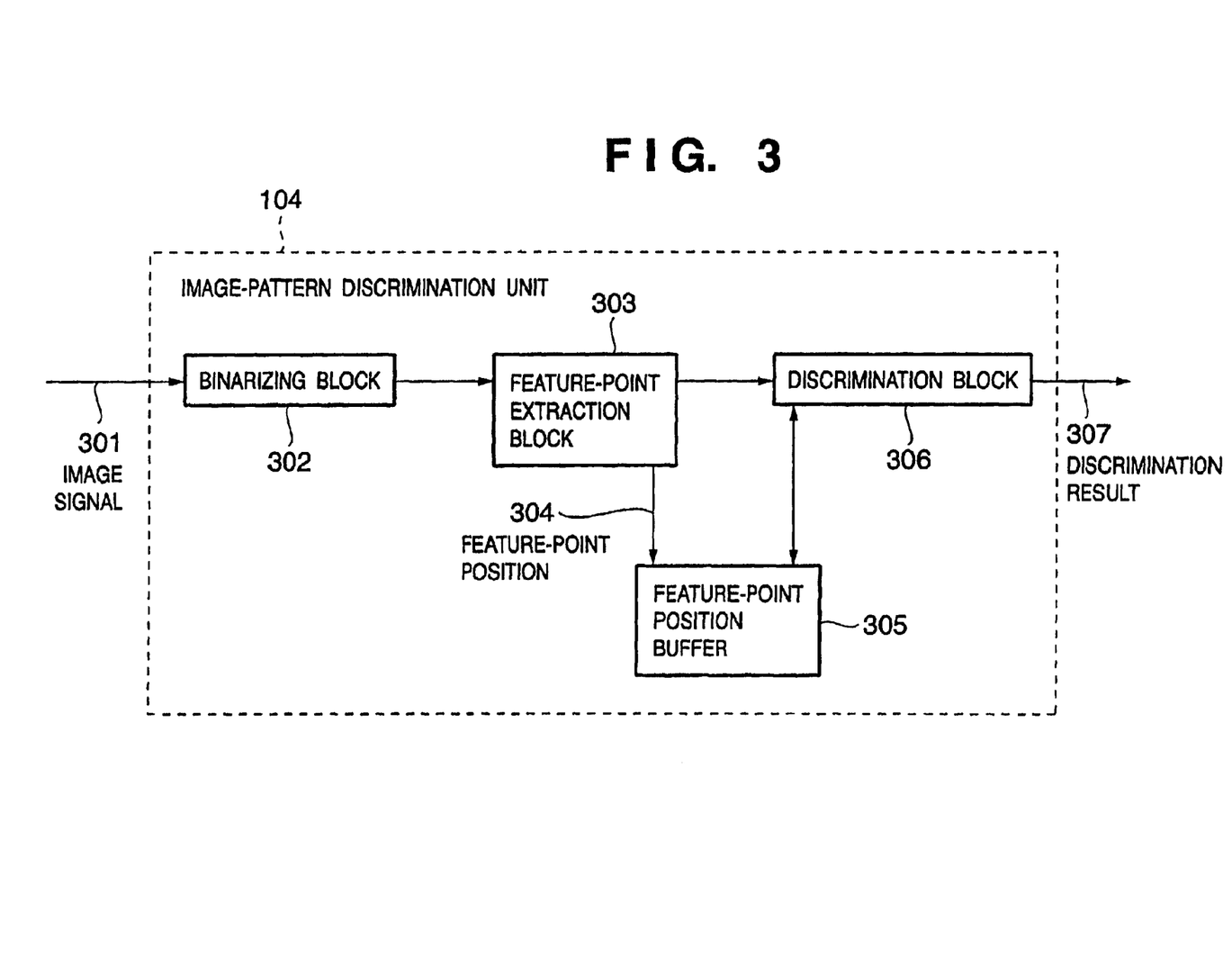
FIG. 3 is a block diagram illustrating the internal structure of an image pattern discrimination unit.

FIG. 3 is a block diagram illustrating the internal structure of the image-pattern discrimination unit 104. The latter executes the processing, described below, for every pixel of the original image.

As shown in FIG. 3, an image signal 301 having R, G, B color components read by the scanner unit 101 are input to the image-pattern discrimination unit 104 by the image processing unit 102.

The image signal 301 that has input from the image processing unit 102 is binarized by a binarizing block 302 and the binary image obtained as a result is sent to a feature-point extraction block 303.

The feature-point extraction block 303 extracts the features of the positioning mark 201 and code-information marks 202 and stores feature-point position information 304, which represents the extracted features, in a feature-point position buffer 305.

On the basis of the information concerning the feature-point positions stored in the feature-point position buffer 305, a discrimination block 306 determines whether the prescribed image pattern (FIG. 2) is included in the image signal 301 read by the scanner unit 101. The discrimination block 306 sends a discrimination-result signal 307, which conforms to the result of discrimination, back to the image processing unit 102.

The image processing unit 102 controls the operation of the printer unit 103 in dependence upon the discrimination-result signal 307 acquired from the discrimination block 306.

Figure 4:
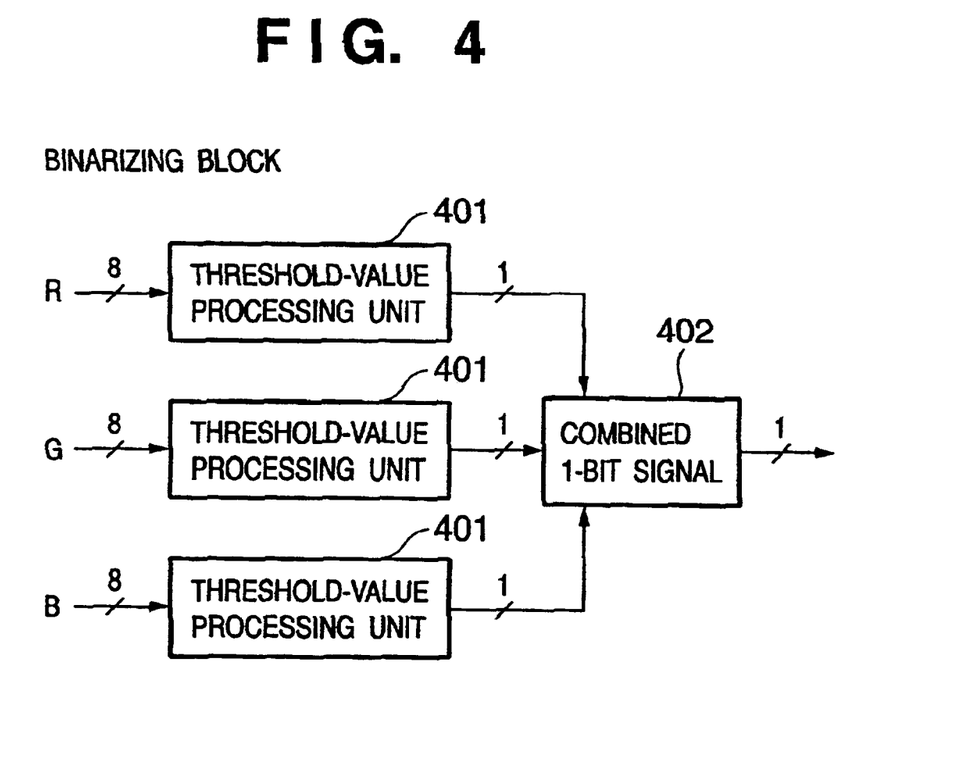
FIG. 4 is a block diagram illustrating the internal structure of a binarizing block.

FIG. 4 is a block diagram illustrating the internal structure of the binarizing block 302.

In this embodiment, the binarizing block 302 accepts the image signal 301 that enters from the image processing unit 102. The image signal 301 comprises the three color components R, G, B, each of which is represented by eight bits per pixel. Threshold-value processing units 401 compare these color components with respective ones of predetermined threshold values. The threshold-value processing method used by the threshold-value processing units 401 involves adopting a "1" value for each pixel (referred to as a "mark pixel" below) constituting the above-mentioned image pattern, and adopting a "0" value for each pixel that is not a mark pixel.

The results of the comparisons performed by the threshold-value processing units 401 for every color component are combined in a combining block 402 as by taking the logical sum of these results. The combined signal is delivered to the feature-point extraction block 303 as an image signal (i.e., a binary image) composed of one bit per pixel.

The feature-point extraction block 303 retains the 1-bit image, which has input from the binarizing block 302, in a memory (not shown) that has a size of the mark 202, and determines, by mask processing described below, whether the input image is a mark pixel constituting the image pattern.

Figure 5:
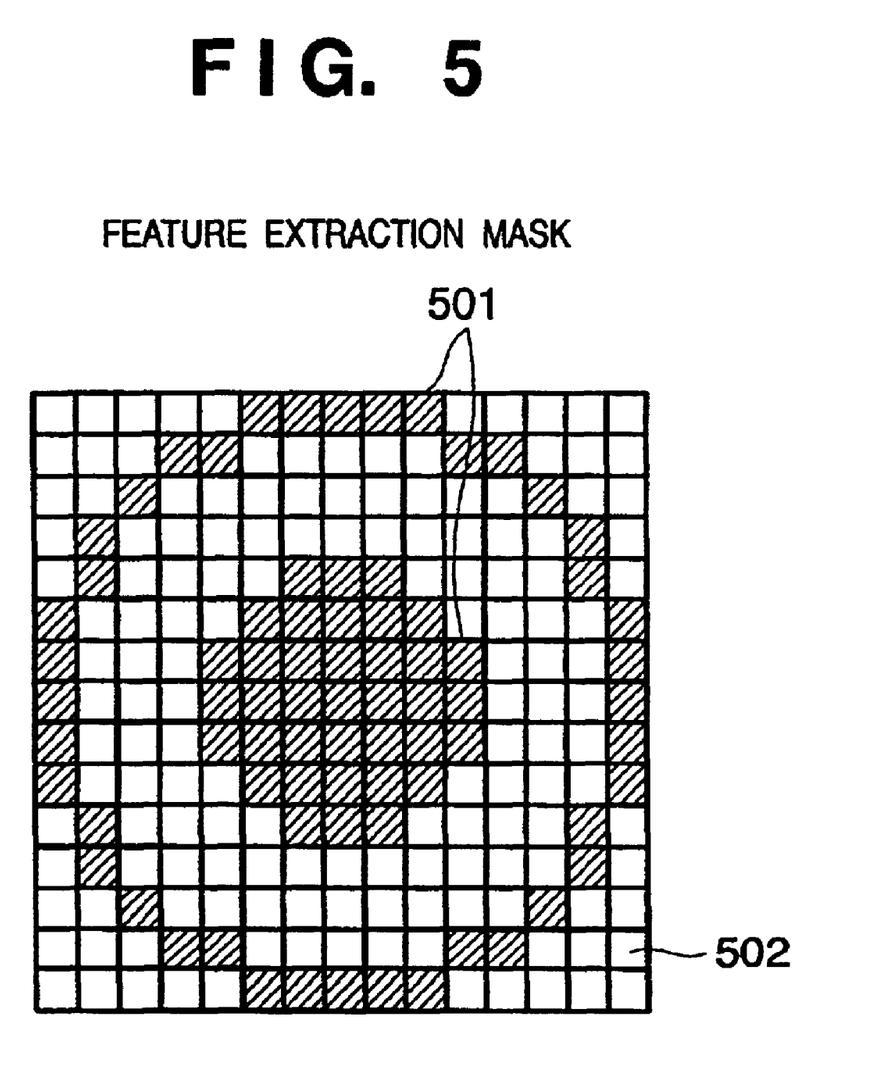
FIG. 5 is a diagram exemplifying a master pattern used in mask processing for feature extraction in this embodiment.

FIG. 5 is a diagram exemplifying a mask pattern used in mask processing for feature extraction in this embodiment.

The mask pattern exemplified in FIG. 5 has a size of 15 (dots)×15 (dots), by way of example, in which numeral 501 denotes a pixel of value "1" (indicated as a black pixel in the drawing) and 502 a pixel of value "0" (indicated as a white pixel in the drawing).

In order to discriminate the marks 202 mentioned above, it will suffice for the feature-point extraction block 303 to use the mask pattern shown in FIG. 5 to perform a product summing operation with respect to the binary image that enters from the binarizing block 302 and to subject the result of this operation to threshold-value processing.

If a pixel is determined to be a mark pixel, the feature-point extraction block 303 preserves the center position of this mark pixel in the feature-point position buffer 305 as the feature-point position information 304.

Figure 6:
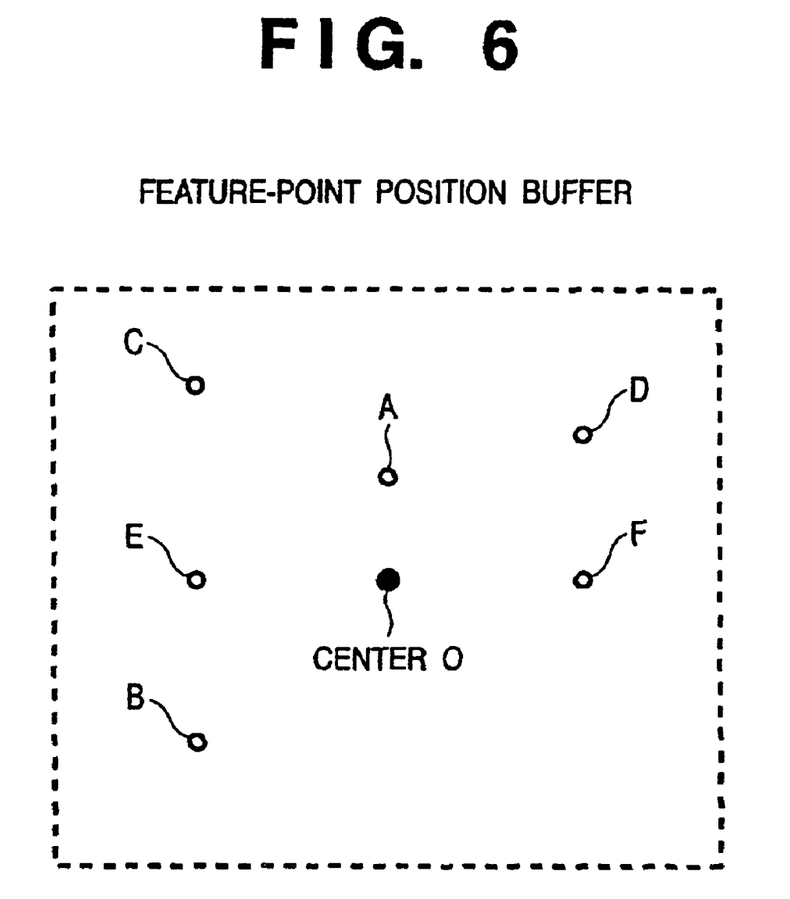
FIG. 6 is a conceptual view showing the manner in which feature-point position information has been stored in a feature-point position buffer.
Figure 7:
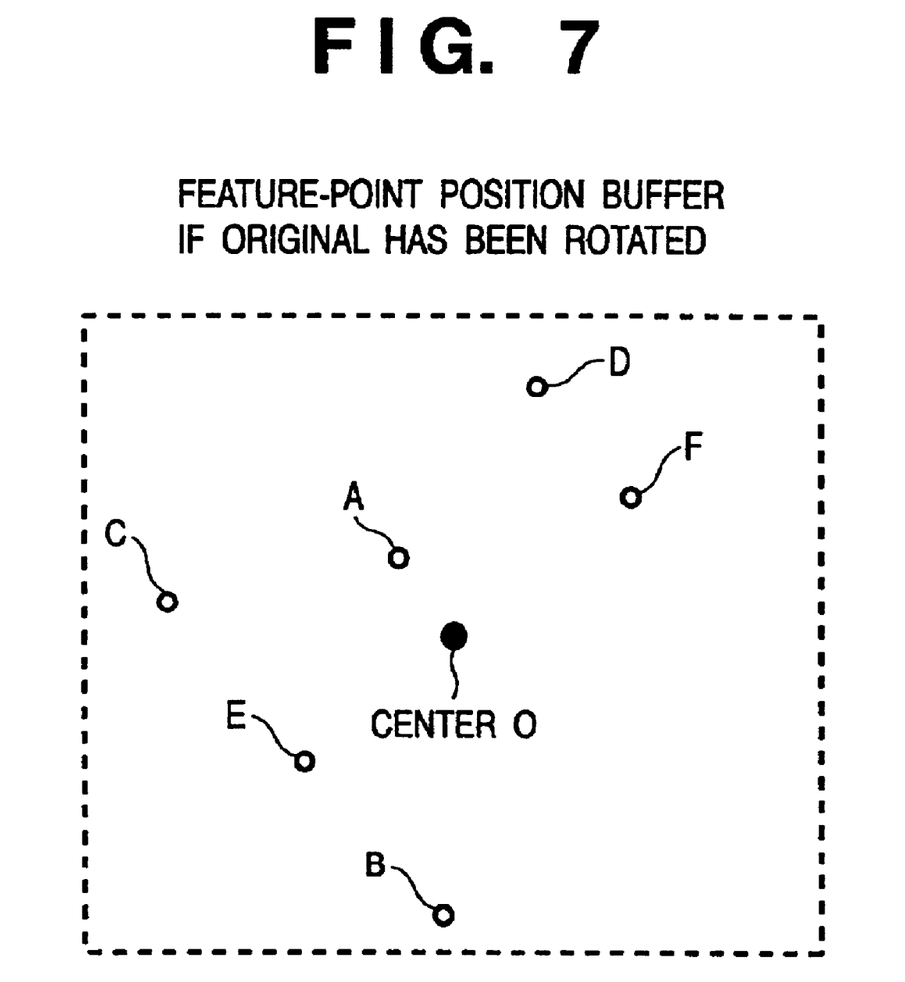
FIG. 7 is a conceptual view showing the manner in which feature-point position information has been stored in the feature-point position buffer.

FIGS. 6 and 7 are conceptual views showing the manner in which the feature-point position information 304 has been stored in the feature-point position buffer 305. FIG. 6 illustrates a case where the original has been placed at the correct position (correct orientation) on the document plate of scanner unit 101, and FIG. 7 illustrates a case where the original has been placed on the document glass upon being rotated.

The feature-point position buffer 305 is constituted by a memory having a size large enough to be able to store the entire area of the image pattern. In this embodiment, the image pattern is a square that is one inch on a side. Accordingly, the feature-point position buffer 305 must be provided with a memory capacity large enough to be able to cover an area of 1.414 inch×1.414 inch in order to take rotation of the original image into consideration.

Further, an imaginary center point O (601) of the image pattern is set on the feature-point position buffer 305 and calculation in the decision processing of the discrimination block 306 is performed using the center point O as a reference.

Figure 8:
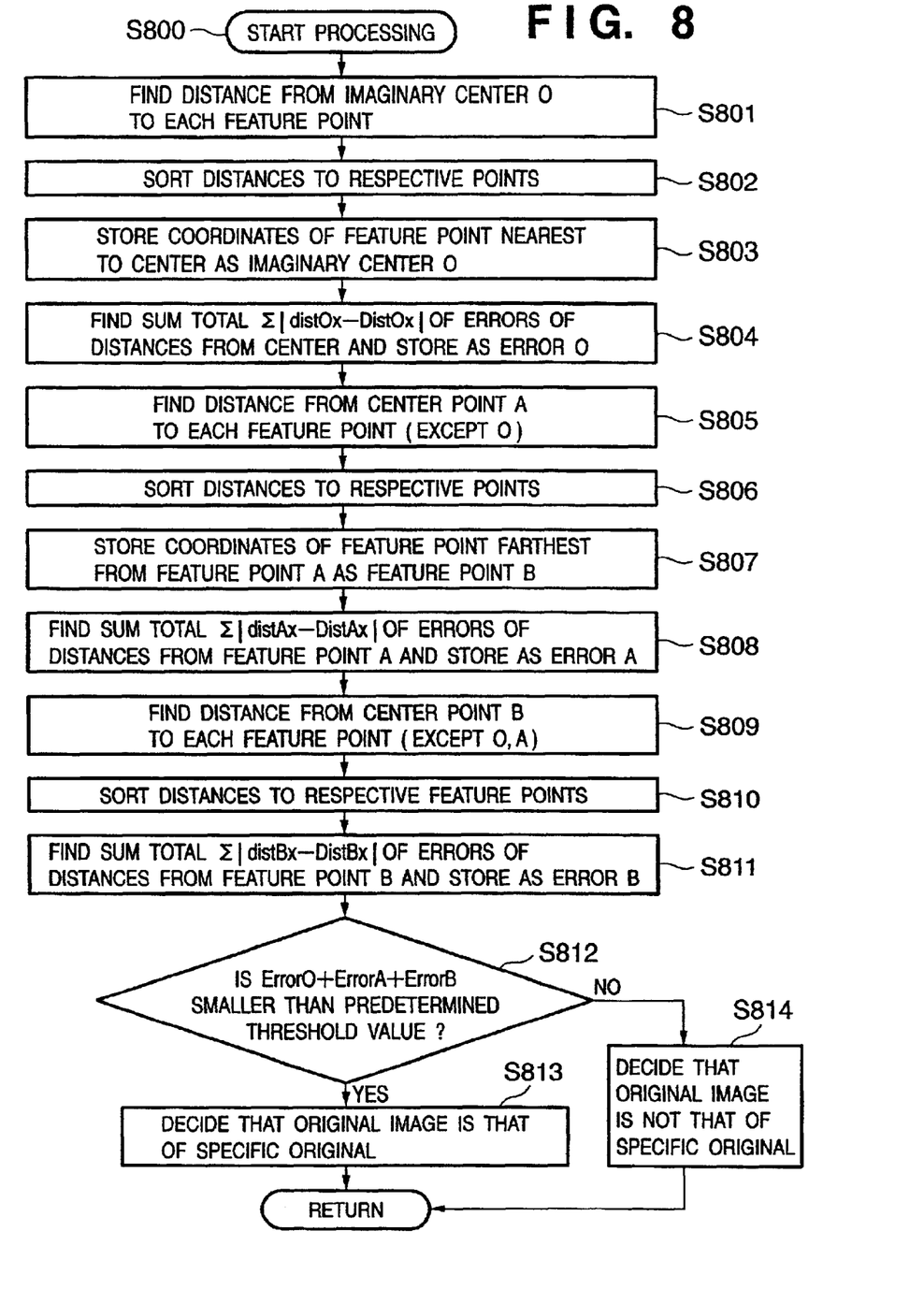
FIG. 8 is a flowchart illustrating discrimination processing executed by a discrimination block in this embodiment.

FIG. 8 is a flowchart illustrating discrimination processing executed by the discrimination block 306 in this embodiment. This represents the processing procedure of a software program executed by a CPU (microcomputer) (not shown) with which the discrimination block 306 is provided. The details of the processing executed by the discrimination block 306 will now be described with reference to FIG. 8.

Step S800: Whenever one pixel enters from the scanner unit 101, control proceeds to discrimination processing described below.

S801: On the basis of the imaginary center point O in the feature-point position buffer 305, the distance to each feature point that has been stored in this buffer is found. In this embodiment, the six distances from the imaginary center point O to the marks A, B, C, D, E and F are calculated (In the description that follows, the distance from a point X to a point Y calculated at this step shall be expressed by dist XY).

It will suffice if the distance between two points (i.e., the distance from the imaginary center point O to each mark) in step S801 is calculated as the ordinary Euclidean distance ($\sqrt{x^2+y^2}$) or square ($x^2+y^2$) of the Euclidean distance.

Step S803: The six distances from the imaginary center point O to the marks A, B, C, D, E and F calculated at step S802 are sorted in order of increasing size, and the coordinates of the feature point that is closest to the imaginary center point O point that is closest to the imaginary center point O are stored as the feature point A.

Figure 9:
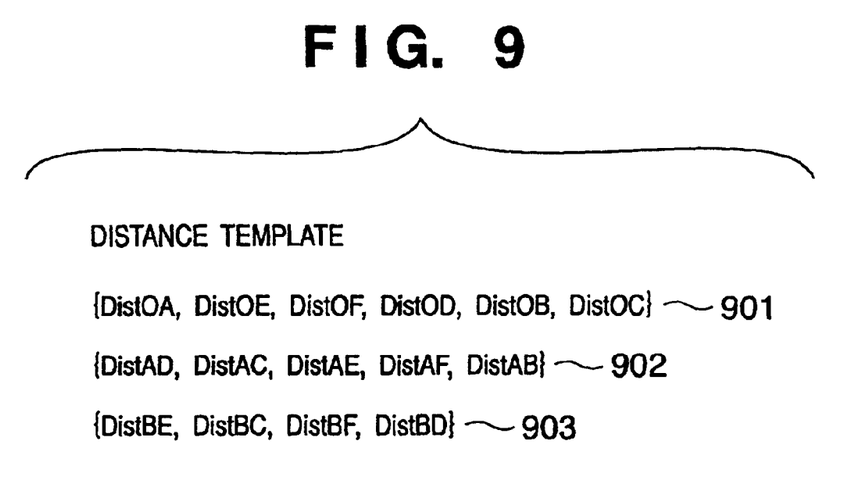
FIG. 9 shows a template of distances between feature-point positions.

Step S804: Here the discrimination block 306 finds the sum total Σ|Dist Ox−dist Ox| (where x=A, . . . , F) of the errors between distances dist OA, dist OE, dist OF, dist OD, dist OB, dist OC from the imaginary center point O and a distance template (901 in FIG. 9) of distances {Dist OA, Dist OE, Dist OF, Dist OD, Dist OB, Dist OC} from the imaginary center point O, and stores this sum total as Error O.

Step S805: The distances from the feature point A, which was stored at step S803, to the feature points B, . . . , F are obtained through a procedure similar to that of step S801.

Steps S806, S807: The distances from the feature point A to each of the other feature points are sorted in order of increasing size (step S806), and the feature point that is farthest from the feature point A is stored as the feature point B (step S807).

Step S808: Here the discrimination block 306 finds the sum total |Dist Ax−dist Ax| (where x=B, . . . , F) of the errors between distances dist AD, dist AC, dist AF, dist AB from the feature point A and a distance template (902 in FIG. 9) of distances {Dist AD, Dist AC, Dist AE, Dist AF, Dist AB} from the feature point A, and stores this sum total as Error A.

Step S809: The distances from the feature point B, which was stored at step S807, to the feature points C, . . . , F are obtained through a procedure similar to that of step S801.

Steps S810, S811: The distances from the feature point B to each of the other feature points are sorted in order of increasing size (step S810), and the discrimination block 306 finds the sum total |Dist Bx−dist Bx| (where x=C, . . . , F) of the errors between distances dist BE, dist BC, dist BF, dist BE from the feature point B and a distance template (903 in FIG. 9) of distances {Dist BE, Dist BC, Dist BF, Dist BD} from the feature point B, and stores this sum total as Error B (step S811).

Steps S812–S814: It is determined whether the sum total of Error O, Error A and Error B obtained at the above-described steps is less that a predetermined threshold value (step S812). If the result of the determination is that this sum total is less than the threshold value, then a decision can be rendered to the effect that the distances between the feature points coincide with a distance template that has been stored in advance. Accordingly, it is decided that the original image read in by the scanner unit 101 is a specific original (step S813) and this is reported to the image processing unit 102 by the discrimination-result signal 307. On the other hand, if the sum total is greater than the predetermined threshold value, then it is decided that the original image read by the scanner unit 101 is not a specific original (step S814) and this is reported to the image processing unit 102 by the discrimination-result signal 307.

When it is found in accordance with the notification received from the discrimination block 306 that the original image is that of a specific original, the image processing unit 102 exercises control so as to halt image formation in the printer unit 103 (or executes image processing different from that executed when ordinary copying is performed). When it is found that the original image is not a specific original, on the other hand, the image processing unit 102 exercises control in such a manner that the printer unit 103 is allowed to perform an ordinary printing operation.

In accordance with this embodiment described above, discrimination is performed by a comparison of values based upon a distance template (FIG. 9) stored in advance as position information of a plurality of marks constituting a prescribed image pattern and distances calculated in accordance with position information of feature points extracted from an original image.

As a result, the memory capacity necessary within the apparatus can be reduced in comparison with the conventional method in which image patterns of a number of types must be stored as templates, and a prescribed image pattern can be discriminated reliably regardless of the orientation of the original image. Rapid processing can be executed even in a case where templates to undergo discrimination are of a plurality of types.

In accordance with the above-described embodiment, therefore, copying is inhibited reliably when a prescribed image pattern is present in a specific original such as a banknote or negotiable instrument whose copying is prohibited. This means that the counterfeiting of such a specific original can be prevented in highly precise fashion.

[Other Embodiment]

The present invention can be applied to a system constituted by a plurality of devices (e.g., a host computer, interface, reader, printer, etc.) or to an apparatus comprising a single device (e.g., a copier or facsimile machine, etc.).

Furthermore, the object of the invention is attained also by supplying a storage medium (or recording medium) storing the program codes of the software for performing the functions of the foregoing embodiment to a system or an apparatus, reading the program codes, which have been stored on the storage medium, by a computer (or a CPU or MPU) of the system or apparatus, and then executing the program codes. In this case, the program codes per se read from the storage medium implement the novel functions of the embodiment and the storage medium storing the program codes constitutes the invention. Furthermore, besides the case where the aforesaid functions according to the embodiment are implemented by executing the program codes read by a computer, the present invention covers a case where an operating system or the like running on the computer performs a part of or the entire process in based upon the designation of program codes and implements the functions according to the embodiment.

Furthermore, the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process based upon the designation of program codes and implements the function of the above embodiment.

Thus, in accordance with this embodiment, as described above, there is provided an image discrimination apparatus, copier and image discrimination method in which a prescribed image pattern contained in an original image is discriminated highly precisely and rapidly regardless of the orientation of the original image.

As many apparently widely different embodiments of the present invention can be made without departing from the spirit and scope thereof, it is to be understood that the invention is not limited to the specific embodiments thereof except as defined in the appended claims.

What is claimed is:

1. An image discrimination apparatus for discriminating a prescribed pattern contained in an original image, comprising:

extraction means for extracting, from an input original image, a plurality of marks having a prescribed color density and disposed in a predetermined positional relationship;

calculation means for calculating the relative positional relationship of the plurality of marks extracted by said extraction means; and discrimination means for discriminating whether or not the prescribed image pattern is present in the original image based upon the relative positional relationship calculated by said calculation means, wherein said calculation means calculates distances between the plurality of marks, which have been extracted by said extraction means, as the relative positional relationship, and said discrimination means includes storage means for storing distances between the plurality of marks, which constitute the prescribed image pattern, as a template, and determines whether or not the prescribed image pattern is present in accordance with a result of a comparison between the distances between the plurality of marks calculated by said calculation means and the distances between the marks stored in said storage means as the template.

2. The apparatus according to claim 1, wherein said discrimination means calculates the sum total of errors between the distances between the plurality of marks calculated by said calculation means and the distances between the marks stored in said storage means as the template, and judges that the prescribed image pattern is present in the original image when the sum total is smaller than a predetermined value.

3. A copier, which includes the image discrimination apparatus described in claim 1, for printing a copy of an original based upon image information relating to the original to be copied, said copier having control means which, when it has been determined that the prescribed image pattern is present in the original image, executes image processing different from that executed when it is judged that the prescribed image pattern is not present in the original image.

4. The copier according to claim 3, wherein said control means inhibits printing when it has been determined that the prescribed image pattern is present in the original image.

5. An image discrimination method for discriminating a prescribed pattern contained in an original image, comprising:

an extraction step of extracting, from an input original image, a plurality of marks having a prescribed color density and disposed in a predetermined positional relationship;

a calculation step of calculating the relative positional relationship of the plurality of marks extracted at said extraction step; and a discrimination step of discriminating whether or not the prescribed image pattern is present in the original image based upon the relative positional relationship calculated at said calculation steps, wherein said calculation steps calculates distances between the plurality of marks, which have been extracted at said extraction step, as the relative positional relationship, and said discrimination step compares distances between the plurality of marks calculated at said calculation step and distances between the plurality of marks, which constitute the prescribed image pattern, stored in advance as a template, and determines whether or not the prescribed image pattern is present in accordance with result of the comparison.

6. The method according to claim 5, wherein said discrimination steps calculates the sum total of errors between the distances between the plurality of marks calculated at said calculation step and the distances between the marks stored in advance as the template, and judges that the prescribed image pattern is present in the original image when the sum total is smaller than a predetermined value.

* * * * *

UNITED STATES PATENT AND TRADEMARK OFFICE
CERTIFICATE OF CORRECTION

PATENT NO. : 6,928,190 B2 Page 1 of 1
DATED : August 9, 2005
INVENTOR(S) : Namikata

It is certified that error appears in the above-identified patent and that said Letters Patent is hereby corrected as shown below:

<u>Column 6,</u>
Line 27, "calculated" should read -- calculated. --.

<u>Column 10,</u>
Line 4, "steps," should read -- step, --;
Lines 5 and 18, "steps" should read -- step --.

Signed and Sealed this

Twenty-third Day of May, 2006

JON W. DUDAS
*Director of the United States Patent and Trademark Office*